Oct. 1, 1935.  M. WILDERMAN  2,016,162
POROUS DIAPHRAGM
Filed Dec. 30, 1932
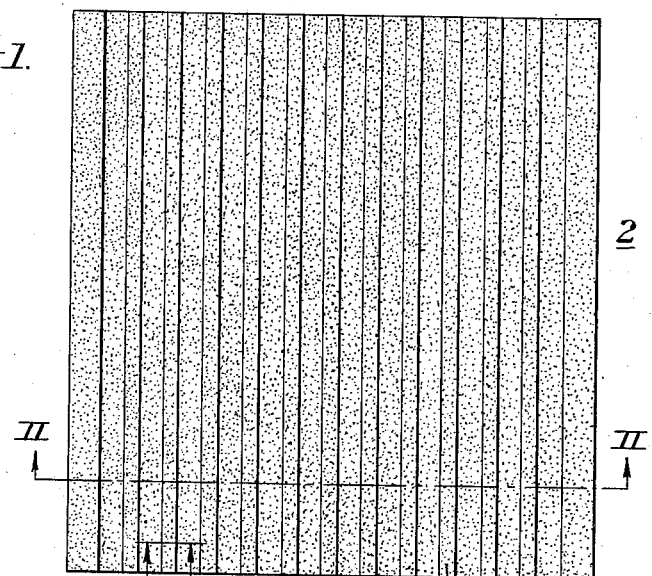
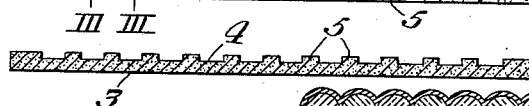
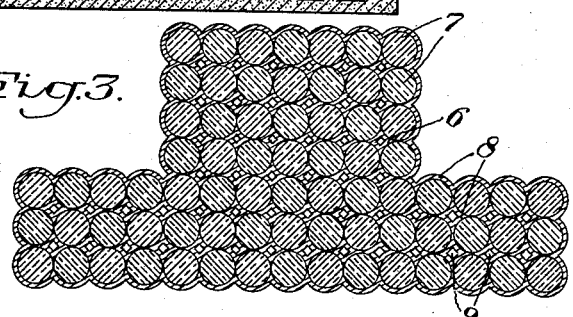
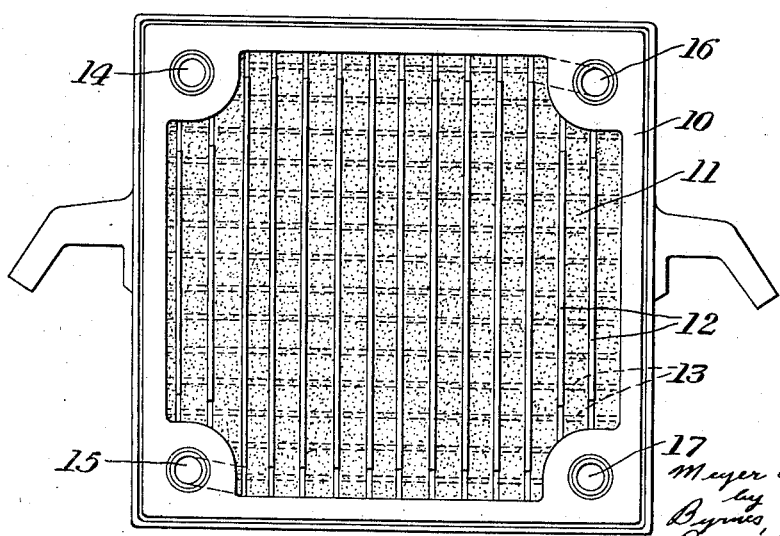
INVENTOR
Meyer Wilderman
by Byrnes, Stebbins,
Parmelee & Blenko
His Attys.

Patented Oct. 1, 1935

2,016,162

UNITED STATES PATENT OFFICE 2,016,162

POROUS DIAPHRAGM

Meyer Wilderman, Monte Carlo, Monaco, assignor to The American Wilderman Porous Ebonite Company, Philadelphia, Pa., a corporation of Pennsylvania Application December 30, 1932, Serial No. 649,668
In Great Britain September 25, 1928

4 Claims. (Cl. 136—146)

This invention relates generally to porous diaphragms adapted for the percolation of liquids therethrough and, more particularly, to separators for electric batteries which have been so treated as to decrease the initial resistance of a battery in which they are placed. The invention is applicable irrespective of the particular material of which the porous diaphragm is made, but it is described herein particularly as applied to the treatment of porous diaphragms made from rubber mixtures which are sometimes referred to as porous ebonite diaphragms, such as can be produced, for example, according to my Patent No. 1,651,567, granted December 6, 1927. In making such diaphragms, discrete solid particles of a vulcanizable rubber mixture are compacted into such volume that adjacent particles are in contact with each other but leave tortuous passages extending through the diaphragm, and the mixture is then vulcanized to produce the porous body.

This application is a continuation-in-part of my application, Serial No. 312,155, filed October 12, 1928.

Although porous ebonite diaphragms made according to my patent above referred to are admirably suited for use as separators in electric batteries, they have the disadvantage that when they are first placed in an electrolyte, for example sulphuric acid, they are not easily wet by the electrolyte. This difficulty in wetting the separator when first placed in the electrolyte results in the battery having an extremely high initial resistance. This difficulty is not experienced with wood separators because they are easily wet by the electrolyte.

In the accompanying drawing, which illustrates two embodiments of my invention,

Figure 1 is a plan view of an ebonite separator for an electric battery;

Figure 2 is a section on the line II—II of Figure 1;

Figure 3 is a greatly enlarged section on the line III—III of Figure 1; and

Figure 4 is a plan view of a filter plate.

It has been proposed previously to treat battery separators with materials which protect them from deteriorating due to the action of the electrolyte and also due to the oxidizing influences of the positive plate of the battery. The Benner Patent No. 1,744,946 discloses the idea of treating wood separators with a solution of sodium silicate and a soluble salt such as sodium sulphate in order to protect the wood separator from the action of the sulphuric acid and the oxidizing influences of the positive plate. According to the Benner patent, a solution of sodium silicate of about 1.15 sp. gr., which is approximately a 15% solution, is saturated with sodium sulphate and the separator is impregnated with this solution. A solution of this density completely fills the pores of the separator. The separator which has been impregnated with this solution is then dried. When the separator is assembled in a battery and the acid is added, the sodium silicate is converted into silica gel, and the particles of sodium sulphate are dissolved, thereby rendering the silica gel more or less porous.

This method, however, does not produce uninterrupted passages through the pores of the separator. When the particles of sodium sulphate are dissolved, the sodium sulphate diffuses out of the silica gel which encases it, leaving a mass of silica gel with discontinuous pockets, the porous silica gel entirely filling the pores and increasing the resistance of a battery in which such separators are used. If a 15% solution of sodium silicate alone is used as the impregnating solution, it increases the internal resistance of the battery too much. It is for this reason that Benner used the sodium sulphate in order that the pores of the separators, instead of being filled with a solid mass of silica gel, are filled with a spongelike mass which has a less resistance than a solid mass of silica gel. The purpose of filling the pores of a wood separator with a porous mass of silica gel as disclosed in the Benner patent is, as above stated, to protect the separator from the action of the electrolyte and the oxidizing action of the positive plate. The silica gel increases the initial resistance of the separator, but this increase in the initial resistance is kept within suitable limits by making the silica gel porous by the use of sodium sulphate.

Ebonite diaphragms, for example porous ebonite separators for use in electric batteries, or diaphragms for use in electrolytic cells, as well as porous soft rubber, present a problem which differs entirely from that presented by wood separators. The porous ebonite separators or porous soft rubber are resistant to the action of the electrolyte and to the oxidizing influence of the positive plate. However, they are wet by the electrolyte only with difficulty, thereby imparting a high initial resistance to the battery when they are first placed therein.

I have found that the initial resistance of batteries having porous ebonite separators can be materially reduced by coating the pores of the separators with a film of a substance which is more easily wet by aqueous solutions than is ebonite itself. The preferred coating material is silica gel, although other substances such as soluble silicates, for example sodium or potassium silicate, aluminum hydroxide, lime, sodium or potassium hydroxides may be used. The coating of the pores of the separator is carried out in such manner that only a thin film of silica gel is formed on the capillary walls of the pores, the greater proportion of the cross-section of the pores being left open for the free passage of electrolyte.

The impregnation of the separators may be carried out in any suitable manner, but preferably by placing the separators under vacuum to withdraw air from the pores and thereafter impregnating them with a dilute silicate solution such as sodium silicate. The separators are then withdrawn from the solution and after draining are treated with sulphuric acid to convert the sodium silicate into silica gel. They are then washed free of sulphuric acid and sodium sulphate and dried. The drying should be carried out at a temperature not substantially over 140° F. as it has been found that if this temperature is exceeded, the desired effects are not obtained.

The preferred solution of sodium silicate contains about 1% of silica ($SiO_2$), although the strength of solution may be varied somewhat. However, the solution should not be so concentrated as to unduly prolong the time of draining or to unduly increase the resistance to flow of the electrolyte. It is preferably of such concentration that only a thin film is deposited on the walls of the pores, leaving an uninterrupted passage through each of the pores.

Referring more particularly to Figures 1 through 3 of the accompanying drawing, there is shown a separator 2 for an electric battery, the separator being made out of ebonite. One side 3 of the separator is flat, whereas the other side 4 is provided with ribs 5 for spacing the body of the separator from the plates of the battery.

After the separator has been formed, but prior to the treatment hereinbefore described to render it easily wet by the electrolyte of the battery, the separator consists of a porous body having pores 6 extending between the ebonite particles 7. In Figure 3, the size of the pores and particles has been greatly exaggerated in order to more clearly illustrate the invention. The walls of the pores are formed by the ebonite particles. In order to render the separator more easily wet by the electrolyte, it is treated with a dilute solution of sodium silicate, and after draining it is treated with sulphuric acid in order to convert the sodium silicate into silica gel. Other solutions as hereinbefore mentioned may be used in place of the sodium silicate. This treatment coats the walls of the pores with thin films 8 of silica gel. These thin films do not close the pores 6 of the separator, but, on the contrary, are only of sufficient thickness to leave uninterrupted passages 9 in the pores of the separator. This treatment increases the wetability of the separator and greatly reduces the initial resistance of a battery containing the treated separators.

In Figure 4 there is shown a filter plate of the type shown in my Patent No. 1,833,101, granted November 24, 1931. The filter plate comprises a frame 10 surrounding a porous ebonite filtering body 11. The body 11 has vertical ribs 12 and horizontal ribs 13 for spacing the adjacent plates. The frame is provided with an opening 14 which forms an inlet for the liquid to be filtered, an opening 15 forming an outlet for the filtrate, an opening 16 forming an inlet for wash water, and an opening 17 forming an outlet for wash water. The filter plate may be treated similarly to the battery separator by coating the walls of its pores with a substance which is more easily wet by the liquid to be filtered than is the ebonite itself. The filter plate may, for example, be treated with sodium silicate and after draining may then be treated with sulphuric acid to convert the sodium silicate into silica gel.

The initial resistance of batteries having wood separators is comparatively low, and for this reason the difficulty which is present when porous ebonite separators are used is not encountered with wood separators. Porous ebonite separators present many advantages over wood separators. They may be made within any of a large range of porosities to adapt them to any particular use and resist acids better than wooden ones. Since they are made by a molding operation, they can be formed in a wide variety of shapes. Many expedients have been resorted to in order to overcome the high initial resistance of batteries containing porous ebonite separators. The initial resistance of such batteries may be lowered by wetting the separators with water under vacuum before they are placed in the electrolyte, but this is a disadvantage since it has to be done just prior to assembling the separators in a battery. It is very desirable to be able to make porous ebonite separators which are dry, and yet in spite of being dry have a low initial resistance when placed in a battery. This is accomplished according to the present invention by coating the pores of the separators with a thin film of a substance which is more easily wet by the electrolyte than is the ebonite itself and which adheres in a continuous film to the surface of the capillaries. Silica gel has proved very suitable for this purpose.

The initial resistance of the porous ebonite separator treated according to my invention is decreased enormously as compared with an untreated ebonite separator. In the following tests, the Kohlrausch method using platinized electrodes having an area of 11.7 square centimeters was used. An untreated porous ebonite separator having a porosity of 50.8% by volume, having a thickness of .75 millimeter was tested using a 0.1 normal sulphuric acid solution. The increase in resistance due to the insertion of a separator between platinized electrodes amounted to 0.784 ohm, which, at the end of five days was reduced to 0.586 ohm. In the case of a separator treated in accordance with this invention by coating the pores with a film of silica gel, the increase in resistance after five minutes immersion was only 0.0161 ohm and at the end of five days this was reduced to 0.0138 ohm.

Instead of impregnating the separator with the silicate solution and then converting the silicate into silica gel or with a mixture of silicate and sulphuric acid, the treatment with sulphuric acid may be eliminated. The finished separators in this case are simply impregnated with a solution of silicate and dried, and the conversion of the silicate into the silica gel is accomplished when the electrolyte is added to the assembled battery. It is preferred, however, to complete the formation of the silica gel before the separators are assembled in the battery. Where this is not done, there is danger that the separators which have been impregnated with the silicate and dried will absorb moisture before they are assembled in the battery. This is objectionable in batteries which are assembled dry because the moisture present induces oxidation of the fully charged negative plate.

Porous bodies made according to this invention may be used generally in all places where a porous body adapted for the percolation of liquids is needed. It may, for example, be used as a filter, as diaphragms in electrolytic cells et cet.

I have described the present preferred embodiment and method of practicing my invention, but it may be otherwise embodied or practiced within the scope of the following claims.

I claim:

1. A porous body adapted for the percolation of liquids therethrough, comprising discrete solid particles compacted into such volume that adjacent particles are in contact with each other but leave tortuous passages extending through the body, the walls of the passages being coated with thin, continuous films of silica gel and leaving continuous passages extending between the faces of the body.

2. A porous body adapted for the percolation of liquids therethrough, comprising discrete solid particles compacted into such volume that adjacent particles are in contact with each other but leave tortuous passages extending through the body, the walls of the passages being coated with thin, continuous films of silica gel, said films being of only such thickness as not to appreciably decrease the cross-sectional area of the passages and leaving continuous passages extending between the faces of the body.

3. A porous separator for electric batteries, comprising discrete solid particles compacted into such volume that adjacent particles are in contact with each other but leave tortuous passages extending through the separator, the walls of the passages being coated with thin continuous films of silica gel and leaving continuous passages extending between the faces of the separator.

4. A porous separator for electric batteries, comprising discrete solid particles compacted into such volume that adjacent particles are in contact with each other but leave tortuous passages extending through the separator, the walls of the passages being coated with thin continuous films of silica gel, said films being of only such thickness as not to appreciably decrease the cross-sectional area of the passages and leaving continuous passages extending between the faces of the separator.

MEYER WILDERMAN.